US007682012B2

(12) United States Patent
Jackson

(10) Patent No.: US 7,682,012 B2
(45) Date of Patent: Mar. 23, 2010

(54) INKJET PRINTING METHOD AND APPARATUS

(75) Inventor: Christian Jackson, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 318 days.

(21) Appl. No.: 11/013,128

(22) Filed: Dec. 15, 2004

(65) Prior Publication Data

US 2005/0140763 A1 Jun. 30, 2005

Related U.S. Application Data

(60) Provisional application No. 60/533,068, filed on Dec. 29, 2003.

(51) Int. Cl.
*G01D 11/00* (2006.01)

(52) U.S. Cl. .......................................... 347/100; 347/95

(58) Field of Classification Search ................. 347/100, 347/101, 95, 96; 106/31.6, 31.27, 31.13; 523/160
See application file for complete search history.

(56) References Cited

U.S. PATENT DOCUMENTS

| | | | |
|---|---|---|---|
| 5,085,698 A | 2/1992 | Ma et al. | |
| 5,231,131 A | 7/1993 | Chu et al. | |
| 5,723,179 A | 3/1998 | Wong et al. | |
| 5,746,818 A * | 5/1998 | Yatake | 347/100 |
| 5,753,016 A | 5/1998 | Hayashi et al. | |
| 6,426,014 B1 | 7/2002 | Silverbrook | |
| 6,442,555 B1 | 8/2002 | Shmuell et al. | |
| 6,443,568 B1 * | 9/2002 | Askeland et al. | 347/100 |
| 6,471,347 B1 | 10/2002 | Koitabashi et al. | |
| 6,621,350 B2 | 9/2003 | Verbist et al. | |
| 6,652,088 B1 | 11/2003 | Palmer et al. | |
| 2002/0033863 A1 | 3/2002 | Silverbrook | |
| 2003/0107631 A1 * | 6/2003 | Goto et al. | 347/100 |
| 2004/0125162 A1 * | 7/2004 | Valero et al. | 347/16 |

FOREIGN PATENT DOCUMENTS

| | | | |
|---|---|---|---|
| EP | 0 726 159 A1 | 8/1996 | |
| EP | 0 556 649 B1 | 6/1999 | |
| WO | WO 01/94476 A2 | 12/2001 | |
| WO | WO 03/097361 A2 | 11/2003 | |

OTHER PUBLICATIONS

International Search Report (PCT/US2004/042987) Dated Apr. 13, 2005.

* cited by examiner

*Primary Examiner*—Manish S Shah
(74) *Attorney, Agent, or Firm*—Angela J Grayson; Simon L. Xu

(57) ABSTRACT

This invention pertains to a method of inkjet printing, in particular to a method of inkjet printing designed for high speed, high quality and high resolution. This invention also pertains to an apparatus to perform the inventive method.

8 Claims, 2 Drawing Sheets

INKJET PRINTING METHOD AND APPARATUS

CROSS-REFERENCE TO RELATED APPLICATIONS

This application claims priority under 35 U.S.C. §119 from U.S. Provisional Application Ser. No. 60/465,955 (filed Apr. 28, 2003), the disclosure of which is incorporated by reference herein for all purposes as if fully set forth.

BACKGROUND OF THE INVENTION

This invention pertains to a method of inkjet printing, in particular to a method of inkjet printing designed for high speed, high quality and high resolution. This invention also pertains to an apparatus to perform the inventive method.

Inkjet printing is a non-impact printing process in which droplets of ink are deposited on print media, such as paper, to form the desired image. The droplets are ejected from a printhead in response to electrical signals generated by a microprocessor.

Inkjet printers offer low cost, high quality printing and have become a popular alternative to other types of printers. However, inkjet printers are presently unable to match the speed of these other printers, especially laser printers.

Most commercial inkjet printers operate with a scanning printhead that moves back and forth over the surface of the print medium printing swathes of the image. The print medium is then advanced step-wise in a direction perpendicular to the scanning direction and the next swath of the image is printed.

Scanning printheads have a number of advantages. For example, a relatively small, inexpensive printhead can be used thus keeping printer costs low. In addition the printhead can be made to scan multiple times over the same area of the substrate to allow slow build up ink for reduced color-to-color bleed, and to allow multiple layers of ink to be applied for increased optical density and chroma. The print medium can also be advanced in increments smaller than the width of the printhead swath and this can be used to hide non-functioning print nozzles by printing over the same area of the print medium with different print nozzles. The primary disadvantage of the scanning printhead is the time that it takes to perform the multiple scans required to cover the whole of the print medium. This time severely limits the throughput of scanning printheads to less than 20 pages per minute.

Full-width arrays have been proposed as one means to address the throughput limitation. In a full-width array, the printhead is at least as wide as the print medium so an image can be printed in a single pass with the substrate moving under the printhead in a direction perpendicular to the array. Historically full-width arrays have not been widely used because of the expense of making a full-width array printhead and the difficulty of getting reliable and uniform jetting from every nozzle of the printhead. However improvements in manufacturing processes and the development of new inkjet printhead technologies have now made full-width array printheads commercially and technically viable.

In a full-width array, the order in which the different colored inks are printed is determined by the printhead design and, unlike a scanning printhead, this order cannot be reversed because there is no return scan. In a reciprocating scanning printhead, any ink can be printed either under or over any other ink.

Ink jet inks are predominantly aqueous based. Colorants that are soluble (dyes) in an aqueous ink vehicle also tend to be resolubilized by water after printing. In other words, images printed with dyes generally lack waterfastness.

One method for making dye-based inks images more waterfast is to treat the image with a "fixing" solution. This fixing solution is usually colorless and can be jetted onto the substrate just like a typical inkjet ink. U.S. Pat. No. 5,723,179 (the disclosure of which is incorporated by reference herein for all purposes as if fully set forth) shows that under-printing of dye-based inks with a fixer can make images water-fast; however, under-printing can decrease the optical density of the images. Also, fixers can cause dull or "muddy" secondary colors.

U.S. Pat. No. 6,621,350 (the disclosure of which is incorporated by reference herein for all purposes as if fully set forth) discloses how aqueous ink jet inks made with water-soluble dyes and vesicle forming surfactants (such as lipids) can be printed on top of an oppositely charged fixer fluid to improve waterfastness with no reduction, or in some cases a slight increase, in chroma.

Printing methods and printhead configurations that can be employed in printers with scanning printheads are not available to or suitable for printers with fixed-array printheads. There is a need for printing methods with array printers that provide good image fastness, especially waterfastness, without negatively affecting other image quality attributes.

SUMMARY OF THE INVENTION

In accordance with one aspect of the present invention, there is provided a method of inkjet printing a substrate, comprising the steps of:

(a) providing an ink jet printer that is responsive to digital data signals, said printer being equipped with a printhead array which is fixed in position ("fixed array");
(b) loading the printer with the substrate;
(c) loading the printer with an ink jet ink set comprising a colored dye ink comprising a dye and a first vehicle, and at least one fixer ink comprising a fixing agent for said colored dye ink and a second vehicle; and
(d) moving the substrate past the printhead array and printing on the substrate using the inkjet ink set in response to the digital data signals, wherein the dye ink and fixer ink are both applied, sequentially, to substantially the same location on the substrate so that the fixer ink is applied over the dye ink within a time interval of less than about 125 ms, preferably less than about 100 ms, more preferably less than about 75 ms, and more preferably in the range of from about 0.1 to about 50 ms.

In accordance with another aspect of the present invention, there is provided an inkjet printer that prints in response to digital data signals, comprising:

(a) a printhead array which is fixed in position and which is equipped with a first series of nozzles in fluid connection with a first colored dye ink, and a second series of nozzles in fluid connection with a first fixer ink for fixing said first colored dye ink, said second series of nozzles being in a downfield position relative to said first series of the nozzles; and
(b) a means for moving a substrate to be printed past the printhead array.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Fixed Array Printer

Figure 1:
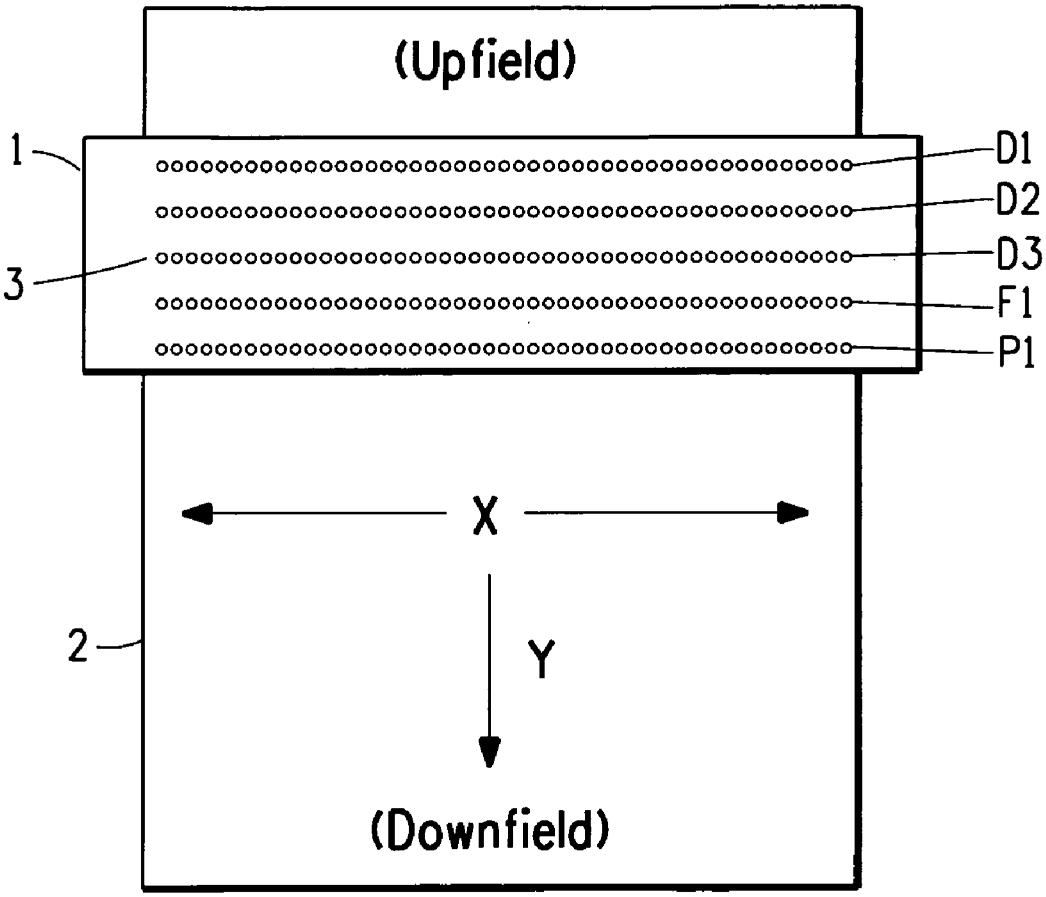
FIG. 1 depicts an exaggerated view of a nozzle arrangement of a printhead (not to scale).

Ink jet printers suitable for use in the present invention are responsive to digital data signals, and are equipped with a printhead array that is fixed in position (fixed array). Although the ink droplets ejected from the printhead can be of any suitable volume, preferably droplets are less than about 10 pL, and more preferably in the range of about 1 to about 5 pL, even more preferably about 1 to about 2 pL. The printer can be, for example, similar to that described in U.S. Pat. No. 6,443,555 (the disclosure of which is incorporated by reference herein for all purposes as if fully set forth). The printhead(s) for such a printer can be, for example, those described in U.S. Pat. No. 6,426,014 and U.S.20020033863 (the disclosures of which are also incorporated by reference herein for all purposes as if fully set forth).

The fixed array printers will generally be capable of printing at least about 600 dpi, preferably at least about 1200 dpi, and more preferably at least about 1600 dpi. Printing is preferably accomplished in one pass and thus the printhead is configured to achieve the stipulated dpi in a single pass of the substrate through the print zone.

The width of the printing zone is at least as wide as the width of the area to be printed so that printing can be performed rapidly in one pass. Accordingly, printheads of this sort are commonly referred to as page-wide arrays or full-width arrays. For so-called "SOHO" (small office, home office) and "network" printing, the width of the printing zone is at least wide as standard papers, such as A4 size paper and/or letter size (8.5×11 inch) paper. For so-called "wide-format" printing, the print zone is preferably at least about 36 inches wide and can accommodate media that is fed from a roll.

Substrates

Substrates suitable for use in the present invention can be any useful substrate known to those of ordinary skill in the relevant art. For example, the substrate can be plain paper such as common electrophotographic copier paper. The substrate can also be specialty media such as microporous papers, polymer coated papers and hybids of the two. The substrate can be polymeric film such as vinyl chloride and polyester. Polymeric films are especially useful in wide-format applications such as signs, billboards and banners. The substrate can be a non-woven textile such as spun bonded polyolefin (e.g. Tyvek®, DuPont Co.). The substrate can also be woven textile such as silk, cotton, nylon and polyester.

Colored Inks

Colored inks comprise a vehicle, preferably an aqueous vehicle, and a colorant. The colorant can be soluble (dye) or dispersed (pigment) in the ink vehicle (mixtures of these are included as well).

Conventional dyes, such as anionic, cationic, amphoteric and non-ionic dyes, are useful in this invention. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes most useful in this invention are, for example, Acid, Direct, Food, Mordant and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

Specific useful dyes include (cyan) Acid Blue 9 and Direct Blue 199; (magenta) Acid Red 52, Reactive Red 180, Acid Red 37, Cl Reactive Red 23; and (yellow) Direct Yellow 86, Direct Yellow 132 and Acid Yellow 23. The black colorant may also be dye as, for example, the black dye disclosed in U.S. Pat. No. 5,753,016 (the disclosure of which is incorporated by reference herein for all purposes as if fully set forth).

Pigments, traditionally, are stabilized to dispersion in a vehicle by dispersing agents, such as polymeric dispersants or surfactants. More recently though, so-called "self-dispersible" or "self-dispersing" pigments (hereafter "SDP") have been developed. As the name would imply, SDPs are dispersible in water, or aqueous vehicle, without dispersants. The black pigment may be stabilized to dispersion by surface treatment to be self-dispersing (see, for example, WO01/94476, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants, which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Useful pigments include (cyan) Pigment Blue 15:3 and 15:4: (magenta) Pigment Red 122; (yellow) Pigment Yellow 128, Pigment Yellow 95, Pigment Yellow 155 and Pigment Yellow 74; and, (black) carbon black.

Fixer Ink

A fixer ink is an ink that is jetted over and/or under a colored ink to enhance the coloristic or durability properties. Generally, a fixer for dye inks is designed to increase waterfastness, and a fixer for pigments is designed to increase chroma and/or optical density. However, fixers may also have other and/or additional beneficial effects.

Fixer inks are generally also substantially colorless and do not perceptibly or substantially change the hue of a colored ink fixed by the fixer ink.

Fixer ink preferably comprises an aqueous vehicle and one or more fixing agent(s). A different fixing agent may be required for dyes than for pigments. Multiple fixing agents may be included in a single fixer so as to fix both dyes and pigments. Alternatively, more than one fixer ink may included in an ink set, for example one fixer ink for dye ink and a second fixer ink for pigment ink.

To minimize the liquid load on the substrate, the fixer ink(s) are preferably formulated to be effective at volumes equal to or less than the volume of colored ink being fixed. Typically, although not necessarily, the drop volume of the fixer ink(s) will be the same as the colored ink(s) and thus, preferably, there will be no more than about one drop of fixer ink for each drop of colored ink.

Fixing agents are most commonly designed to operate by electrostatic interaction with the colorant. Thus, an anionic dye or pigment dispersion is treated with a cationic fixing agent, or a cationic colorant is treated with anionic fixing agent, thereby immobilizing or "fixing" the colorant. This process is sometimes referred to in the art as "insolubilizing", "precipitating" or "crashing" the colorant. Other mechanisms of fixation are also possible such as agents that immobilize colorant by sudden and dramatic pH or viscosity change. In some cases a combination of mechanisms may be operative.

A cationic polymer may be employed as a fixing agent. The cationic polymer can be a water-soluble polymer, a cationic hydrosol or dispersed polymer, or an emulsion polymer dispersed in the liquid composition vehicle. Examples of preferred water-soluble cationic polymers are protonated forms of polyamines including polyethyleneimine, polyvinylpyridine, polyvinylamine, polyallylamine and combinations thereof. In preferred embodiments, the cationic polymer is selected from the group polyethyleneimines, water-soluble cationic dendrimers, water-dispersed alkoxylated forms of polyethylenimines, water-soluble dispersed alkoxylated forms of cationic dendrimers, and poly diallyldimethyl ammonium chlorides. In a particularly preferred embodiment, the soluble cationic polymer is a polyethyleneimine.

The preferred molecular weight, Mn, of soluble polymer fixing agents is between about 1,000 and 10,000 g/mol.

The cationic polymer may also be a copolymer of different cationic monomers or a copolymer of cationic and nonionic monomers. The copolymer can be random or structured, linear, grafted (comb) or branched.

Examples of polymerizable monomers that can be incorporated into water-soluble homo-polymers or co-polymers include acrylic esters having tertiary amines such as N.N-dimethylaminoethyl methacrylate, N.N-dimethylaminoethyl-acrylate, N.N-dimethylaminopropyl-methacrylate, N.N-dimethylaminopropyl-acrylate; acrylamides having tertiary amines such as N,N-dimethylaminopropyl acrylamide, N,N-dimethylaminoethyl acrylamide, N,N-dimethylaminopropyl methacrylamide, N,N-dimethylaminoethyl methacrylamide and the like. When the monomers having tertiary amines are used, they are neutralized with an acid and dissolved in water. The monomers may be quaternized by a known method.

Cationic emulsion or dispersed polymers may be employed as a fixing agent.

These can be made from polymerizable monomers such as mentioned in the preceding paragraph.

Multivalent metal cations may be employed as a fixing agent. "Multivalent" indicates an oxidation state of two or more and, for an element "Z", are typically described as $Z^{2+}$, $Z^{3+}$, $Z^{4+}$ and so forth. For brevity, multivalent cations may be referred to herein as "$Z^x$". The multivalent cations are preferably soluble in the aqueous ink vehicle and preferably exist in a substantially ionized state. The multivalent cations should be in a form where they are free and available to interact with colorant being fixed.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. Preferred those of the elements Ca, Mg, Zn, Cu and Al. The effective amounts needed in a particular situation can vary, and some adjustment will generally be necessary.

Other examples of cationic substances which may be useful as fixing agents include primary, secondary or tertiary amine salt compounds, such as hydrochloride or acetate of lauryl amine or stearyl amine; a phosphonium salt; a sulfonium salt; an ammonium salt, such as quaternary ammonium salts such as lauryltrimethylammonium chloride or benzyltributylammonium chloride; a pyridium salt compound such as cetylpyridinium chloride or cetylpyridinium bromide; and an arsonium salt. The ammonium, phosphonium and arsonium salts may be mono-, di-, tri or tetra-substituted or mixtures thereof.

A cationic surfactant may be used as a fixing agent including, for example, quaternized ammonium or pyridinium surfactants, such as dodecyltrimethylammonium chloride, cetyltrimethylammonium bromide, cetyltrimethylpyridinium chloride and others.

Amphoteric surfactants that, within a certain pH range, are cationic may also be used. In this case the pH of the liquid composition must be adjusted below the isoelectric point of the surfactant. Examples of zwitterionic surfactants that are useful in the practice of the invention include N,N-dimethyl-N-tetradecyl amine oxide (NTAO), N,N-dimethyl N-hexadecyl amine oxide (NHAO) and related amine oxide compounds. Another example is N-dodecyl-N,N-dimethyl glycine. Yet other examples include phosphates, phosphites, phosphonates, lecithins and the like, and phosphonate esters such as phosphomyelin.

Anionic polymer may be employed as a fixing agent. The anionic polymer can be a water-soluble polymer, or a dispersed polymer. Examples of preferred water-soluble anionic polymers are random and block copolymers of acrylic acid or methacrylic acid, styrene and acrylate ethers such as methyl acrylate, butyl acrylate, hexyl acrylate, methyl methacrylate, butyl methacrylate, hexyl methacrylate, hydroxyethylmethacrylate, ethyltriethyleneglycol methacrylate and derivatives thereof. The copolymers may be structured as comb or star polymers, or may be randomly branched. Alternatively the polymer can be a hydrolyzed copolymer of styrene and/or maleic acid anhydride.

The acid containing polymers must be partially transformed into the salt form by adding an alkali such as sodium hydroxide, potassium hydroxide, lithium hydroxide, ammonia or an amine.

The anionic polymer may also be a copolymer of different anionic monomers, or a copolymer of anionic and nonionic monomers. The copolymer can be random or structured, linear, grafted (comb) or branched.

Anionic dispersed polymers may be used as fining agents. These can be made from polymerizable anionic monomers herein before mentioned.

Anionic surfactants may be employed as a fixing agent including, for example, sodium dodecyl sulfate and sodium xylene sulfonates.

Amphoteric surfactants that, within a certain pH range, are anionic may also be used. In this case the pH of the liquid composition must be adjusted above the isoelectric point of the surfactant. Examples of zwitterionic surfactants that are useful are mentioned above.

Vehicle

The vehicle is preferably an "aqueous vehicle" by which is meant water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Other Ingredients

Other ingredients may be formulated into the inkjet ink (colored or fixer), to the extent that such other ingredients do not interfere with the stability and jetablity of the ink, which may be readily determined by routine experimentation. Such other ingredients are in a general sense well known in the art.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, based on total weight of the ink.

In a colored ink, colorant will generally be present in amounts up to about 12%, and more typically in the range of about 0.1 to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

For fixer inks with soluble polymer (cationic or anionic) as fixing agent, the fixing polymer is advantageously used at levels, based on the final weight of the fixer ink composition, of at least 0.3% and preferably at least about 0.6%. Upper limits are dictated by viscosity or other physical limitations. In a preferred embodiment, no more than about 5% soluble polymer is present in the liquid composition, and even more preferably no more than about 4%, based on the total weight of the liquid composition.

For fixer inks with polyvalent metal salts as fixing agent, the salt is advantageously used at levels, based on the final weight of the fixer ink composition, in the range of about 0.1 to 10% and more typically in the range of about 1 to 5%.

Other ingredients (additives), when present, generally comprise less than about 15% by weight, based on the total weight of the ink. Surfactants, when added, are generally in the range of about 0.2 to about 3% by weight based on the total weight of the ink. Polymers, other than polymeric fixing agents, can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the application contemplated by this invention will generally require lower viscosity ink. Thus the viscosity (at 25° C.) of the inks can be less than about 7 cps; less than about 5 cps, and less than about 3.5 cps.

Ink Set

The term "ink set" refers to all the fluids an inkjet printer is equipped to jet. These fluids include all colored inks and all fixer inks. Other inks (or fluids) could also be present such as, for example, an additional colorless ink containing a durability or gloss enhancing ingredient which would be applied after all of the colored and fixer inks (a "top-coat") to increase abrasion resistance and/or gloss of the printed images.

The ink sets preferably contain at least three colored inks (cyan, magenta and yellow—CMY), and preferably at least four colored inks (black—K). Each of the colored inks in the ink set may be dye and/or pigment based.

Apparatus

In another aspect, the present invention pertains to an inkjet printer with a fixed array printhead configured to deliver ink according to the prescribed inventive method. One such configuration is depicted in FIG. 1.

Referring to FIG. 1, a printhead 1 is shown spanning the width of a substrate 2. The substrate 2 moves past the printhead 1 in the "Y" direction. The Y direction after printing is referred to as "downfield" and before the printing as "upfield". The nozzles 3 in the printhead 1 extend in the X direction to at least the margins of the print area. The extent of the margins is a matter of choice.

Referring to FIG. 1, there is depicted, for simplicity, an exaggerated view of the nozzle arrangement (not to scale). The series of nozzles 3 designated D1, D2 and D3 depict nozzles for jetting three different dye inks; nozzle series F1 depicts nozzles jetting fixer; and nozzle series P1 depicts nozzles jetting pigment. This arrangement could, for example, represent a nozzle arrangement for a four-color ink set, wherein the three dye inks are cyan, magenta and yellow colored, the pigment ink is black, and the fixer ink is colorless and fixes the three dye inks and the pigment ink. Thus, the F1 nozzles are located downfield of the dye nozzles D1, D2 and D3 so as to jet over the dye (overprinting), and upfield of the pigment nozzles P1 so as to jet under the pigment (underprinting). The nozzle configuration in FIG. 1 can be written in short hand notation as D1-D2-D3-F1-P1 when the nozzle series are considered from upfield to downfield direction.

Depending on the particular ink set employed, various printhead configurations can satisfy the prescribed upfield/downfield nozzle arrangement. For example, another embodiment for a four-color ink set where all colored inks are dyes (D1 through D4) is printhead configuration D1-D2-D3-D4-F1 (using the same written notation as before). There can be an expanded colorant set where all colorants are dyes (for example a dye set comprising cyan, magenta, yellow, black, red and blue, D1 through D6), wherein the nozzles are configured D1-D2-D3-D4-D5-D6-F1. The black dye ink in this set can be re-placed by a pigment black (P1) so that the configuration would be D1-D2-D3-D4-D5-F1-P1. There can be two different fixers, F1 for dyes and F2 for pigment, such that a nozzle arrangement for a three-color dye set and a pigment black can be D1-D2-D3-F1-F2-P1. Alternatively, this same set could be configured F2-D1-D2-D3-F1-P1, or D1-D2-D3-F2-P1-F1, or F2-D1-D2-D3-P1-F1. All of these configurations would maintain the arrangement of placing the dye fixer nozzles downfield of the dye ink nozzles, dictating dye inks will be overprinted with fixer, and placing pigment fixer nozzles (when present) upfield of the pigment ink nozzles, dictating pigment inks will be underprinted with fixer.

The nozzles in FIG. 1 are shown extending perpendicular to the substrate feed direction, but this need not be the case. It may be advantageous to configure the printhead at an angle from the perpendicular. Such an angled configuration can sometimes allow higher dpi. Also, the printhead need not be monolithic but rather can be, for example, a series of small printheads positioned ("tiled") together. Furthermore, the nozzles of a given color need not be in a straight row but rather can be any suitable arrangement, for example, some sort of staggered arrangement. WO03/097361 illustrates several embodiments of a fixed array comprised staggered, tiled printheads, and U.S. Pat. No. 6,652,088 illustrates a fixed array comprised of staggered, tiled and angled printheads (the disclosures of both of the publications are incorporated by reference herein for all purposes as if fully set forth).

The series of nozzles for all the fixer and colored inks need not be packed closely together. Any or all of the colors and fixers could be separated somewhat (in the Y direction in FIG. 1) from any other color or fixer. However, in a preferred embodiment, all of the nozzles are confined in the Y direction to be within the length of typical page (such as A4 paper or letter size paper). In other words, the most upfield and most downfield nozzles will be no more than about 11 inches apart in the substrate feed direction. With regard to the inventive method, the spacing of the nozzles is constrained in another aspect by the substrate feed rate so that the limited time interval between application of colored ink and fixer prescribed by the method is satisfied.

Figure 2:
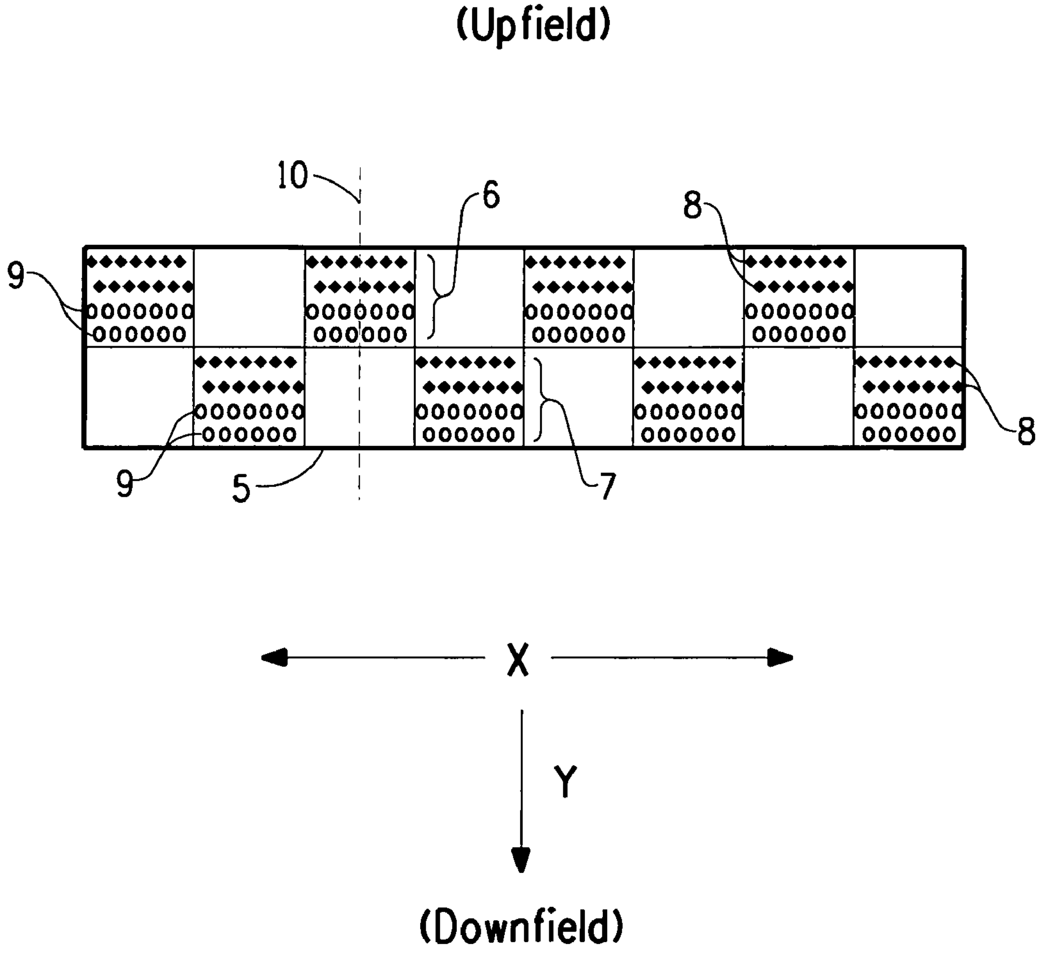
FIG. 2 depicts a printhead array wherein the nozzles are a staggered network of modules tiled together.

Referring to FIG. 2, there is depicted an embodiment in which a printhead array 5 comprises nozzles (e.g., 8 and 9) in a staggered network of modules (e.g., 6 and 7) tiled together. In this case, the array consists of eight modules, two of which are labeled module 6 and module 7. Each module has four rows of nozzles represented by filled or unfilled circles. The filled circles are dye ink nozzles (e.g. 8) and the unfilled circles are fixer ink nozzles (e.g., 9). The nozzle arrangement depicted represents a single dye ink and a single fixer ink, but the concepts described can easily be applied to any number colored and fixer inks.

Further in regard to FIG. 2, there is further illustrated the prescribed upfield/downfield relationship of nozzles. As just indicated, the printhead array 5 contains a plurality of nozzles in a plurality of spaced-apart modules (e.g., 6 and 7). Reference is made to "corresponding nozzles" (dotted line 10), which means nozzles that are aligned in the "Y" (substrate feed) direction such that they can print on the same part of a substrate (not depicted). Even though there are dye nozzles in module 7 which are further down in the Y direction than fixer nozzles in module 6, the dye nozzles in module 7 do not "correspond" to the fixer nozzles in module 6 and cannot jet on the same part of the substrate (fed in the Y direction). On the contrary, all the fixer nozzles in module 7 have corresponding dye nozzles.

Means for Moving Substrate

The means for moving the substrate to be printed past the print zone can be any known means, and an equivalent thereto. Substrate handling means in printers, including printers other than inkjet printers, are generally well known in the art and numerous commercial examples exist.

As the present invention pertains to a page-wide array that preferably accomplishes all printing in one pass, preferably the substrate handling means, and any associated electronic controls, are designed to move the substrate past the print zone once and only once.

EXAMPLES

Preparation of Pigment Dispersion 1

Carbon black (FW-18 from Degussa, surface area 260 $m^2/g$) was oxidized with ozone according to the process described in WO01/94476. After recovery, a 17 weight percent dispersion of self-dispersing carbon black pigment in water was obtained with a viscosity of 6.4 cps (25° C.). The median particle size was 90 nm and the acid number (degree of functionalization) was less than 2.8 μmol/m2.

Preparation of Inks

Two inks were formulated with the components shown in Table 1. Ink A contained a cyan dye DB 199 at 3%. Ink B, contained carbon black pigment dispersion. Ingredients are percent weight of the total weight of ink.

| | Ink Formulations (% Weight) | |
|---|---|---|
| Ingredients | Ink A | Ink B |
| Direct Blue 199 | 3.0 | — |
| Pigment Dispersion 1 (as % pigment) | — | 3.0 |
| 1,2-hexanediol | 4.0 | 5.0 |
| Glycerol | 20.0 | 15.0 |
| Ethylene glycol | 5.0 | 5.0 |
| 2-pyrrolidone | 3.0 | 3.0 |
| Surfynol ® 465 | 0.2 | 0.2 |
| Triethanol amine | — | 0.2 |
| Water (to 100%) | Balance | Balance |

Surfynol ® 465 is a surfactant from Air Products Corporation.

Preparation of Fixer Fluid

The fixer fluid was prepared by mixing ingredients together according to the following recipe:

| Fixer Ingredients | % Weight |
|---|---|
| Calcium nitrate tetrahydrate | 3.5% |
| Polyethyleneimine | 3.5% |
| Tetraethylene glycol | 6.0% |
| 2-pyrrolidone | 4.0% |
| 1,5-pentanediol | 10.0% |
| Tergitol ® 15-S-7 | 1.25% |
| Proxel ® GXL | 0.25% |
| Water | Balance |

Polyethyleneimine (PEI) was Lupasol ® FS from BASF.
Proxel ® GXL is a biocide from Avecia Corporation.
Tergitol ® 15-S-7 is a surfactant from Niacet Corporation.

Printing

Printing of the inks was performed on a printing apparatus consisting of two Epson 850 piezoelectric ink-jet printheads mounted in fixed position above a rotating drum to which the substrate was attached. The two printheads were aligned to print on the same area of the substrate and there was a fixed gap between them so that the time interval between printing of the two fluids was controlled by the drum speed which could be varied as needed to provide the desired interval. The printheads were approximately 1 cm wide and produced a stripe of the same width. Drop size could be varied by altering the piezoelectric element drive signal. The time interval between printing the ink and the fixer fluid was generally 50 milliseconds (ms) unless otherwise stated. The drum direction was reversed, when needed, to change the order of printing of the two fluids.

Substrate

The substrate used in all print tests was Xerox 4024 (X4024) plain paper.

Measurement of Optical Density

OD and chroma was measured using a Greytag-Macbeth SpectroEye (Greytag-Macbeth AG, Regensdorf, Switzerland).

Measurement of Water Fastness

Water fastness of the prints was measured by dripping 2 mL of deionized water over the printed area with the substrate held at a 45 degree angle to vertical, with the water being allowed to run over the pattern due to gravity in a direction perpendicular to the line. The water was applied 10 seconds after the prints were made. The water fastness was evaluated visually according to the following scale:

(A) No movement of colorant (good)
(B) Slight movement of colorant (fair)
(C) Significant movement of colorant (poor)

Measurement of Smear

Smear was tested by making two strokes, one on top of the other, with a high-lighter pen across a printed stripe. Suitable highlighter pens are available, for example, under the trademarks Hi-Liter® Highlighting Marker and Hi-Liter® Fluorescent Marker from Avery Dennison Corporation. This test was repeated on different parts of the test pattern at one minute and ten minutes after printing. The stripes were evaluated for smear-fastness by visual inspection according to the following scale:

(A) No movement of colorant (good)
(B) Slight movement of colorant (fair)
(C) Significant movement of colorant (poor)

Fixer Over- and Under-Printed

The results in the following table demonstrate the benefits of over-printing. The time interval between ink and fixer in both cases was 50 ms.

| Test | Optical Density | Chroma | Water-fastness | Smear |
|---|---|---|---|---|
| Ink A, no fixer (control) | 1.06 | 51 | C | B |
| Ink A over-printed with fixer (inventive) | 0.93 | 45 | A | A |
| Ink A under-printed with fixer, (comparative) | 0.86 | 43 | A | B |

Overprinting the dye-based ink with fixer gives higher optical density and chroma than underprinting. Also, overprinting the dye-based ink with fixer provides both improved water fastness and smear resistance.

Effect of Time Intervals

Ink A was underprinted with fixer at different time intervals. Optical density results are reported in the following table.

| Time interval between printing fixer and Ink A | Optical Density |
|---|---|
| 0.05 sec | 0.86 |
| 0.125 sec | 0.89 |
| 0.5 sec | 0.97 |
| 1 minute | 1.05 |
| Ink A, no fixer | 1.06 |

As the time interval between fixer and dye application decreases, the reduction in OD becomes more pronounced. Probably, at shorter time intervals, less of the fixer vehicle has evaporated allowing greater penetration of the dye and therefore decreased OD. This invention, however, is not bound by any particular theory.

Fixation of Pigment Ink

| | Optical Density |
|---|---|
| Ink 2 | 1.02 |
| Ink 2 under-printed with fixer | 1.40 |
| Ink 2 over-printed with fixer | 1.08 |

These results demonstrate that, unlike dye-based ink, under-printing the pigment-based ink with fixer increases OD. Over-printing pigment with fixer has at most only a slightly beneficial effect on OD, although it will probably still improve fastness properties.

The invention claimed is:

1. A method of inkjet printing on a substrate, comprising the steps of:

(a) providing an ink jet printer that is responsive to digital data signals, said printer being equipped with a page-wide printhead array;

(b) loading the printer with the substrate;

(c) loading the printer with an ink jet ink set comprising (i) a first colored dye ink comprising a first dye and a first vehicle, (ii) a second colored dye ink comprising a second dye and a second vehicle, (iii) a third colored dye ink comprising a third dye and a third vehicle, (iv) a first fixer ink comprising a first fixing agent for said first, second and third colored dye inks and a fourth vehicle, and (v) a first colored pigment ink comprising a first pigment and a fifth vehicle; and (d) moving the substrate past the page-wide printhead array and printing on the substrate using the inkjet ink set in response to the digital data signals, wherein each of the first, second and third colored dye inks are differently colored and are applied on the substrate in any order and any combination, wherein said first, second and third colored dye inks, are overprinted with the first fixer ink within a time interval of less than 100 ms; and wherein the first colored pigment ink is applied to the first fixer ink within a time interval of no more than about 100 ms after the fixer ink has been applied to the first, the second, and the third colored dyes.

2. The method of claim 1 wherein the first, second, third and fourth vehicles are aqueous vehicles.

3. The method of claim 1, wherein the ink set further comprises a first colored pigment ink comprising a first pigment and a fifth vehicle, and a second fixer ink comprising a second fixing agent for said first colored pigment ink and a sixth vehicle, wherein the first colored pigment ink is underprinted with the second fixer ink within a time interval of no more than about 125 ms.

4. The method of claim 1, wherein the page-wide printhead array ejects droplets of ink having a volume in the range of about 1 to about 10 pL.

5. The method of claim 4, wherein the page-wide printhead array ejects droplets of ink having a volume in the range of about 1 to about 5 pL.

6. The method of claim 5, wherein the page-wide printhead array ejects droplets of ink having a volume in the range of about 1 to about 2 pL.

7. The method of claim 1, wherein the time interval between the colored ink and the fixer ink is less than about 75 ms.

8. The method of claim 1, wherein said first, second, and third colored dyes are anionic dyes and said first fixing agent comprises one or more members of the group consisting of multivalent cations soluble in said fourth vehicle and cationic polymers.

* * * * *